June 15, 1965 H. HEINLEIN 3,188,717

CUTTING HEAD FOR LATHES

Filed March 15, 1963 2 Sheets-Sheet 1

INVENTOR.
HANS HEINLEIN

BY *Rupert J. Brady*

ATTORNEY

June 15, 1965   H. HEINLEIN   3,188,717
CUTTING HEAD FOR LATHES

Filed March 15, 1963   2 Sheets-Sheet 2

INVENTOR.
HANS HEINLEIN
BY
*Rupert J. Brady*
ATTORNEY

United States Patent Office 3,188,717
Patented June 15, 1965

3,188,717
CUTTING HEAD FOR LATHES
Hans Heinlein, 13–15 Bahnhofstrasse, Zirndorf, near Nurnberg, Germany
Filed Mar. 15, 1963, Ser. No. 265,503
Claims priority, application Germany, Mar. 20, 1962, H 45,206
5 Claims. (Cl. 29—96)

This invention relates broadly to machine tool cutting heads and more particularly to a cutting tool for lathes which is particularly well suited to function as a rotating cutting tool.

The prior art discloses cutting tool constructions for rapid cutting machines, such as lathes, which generally consist of a round disc having a perimeter cutting edge, the cross-section of which corresponds to the profile of a machine screw thread. This type of cutting tool is usually connected to a tool bar or tool holder by means of a screw extending through a center aperture in the cutting disc and into threaded engagement with the tool bar, with the screw being tightened to prevent relative movement between the cutting disc and tool bar. Cutting discs of this type can be manufactured in several ways including producing cutting steel directly in disc form.

With this form of cutting tool when the used sections of the disc cutting edge becomes dulled, the screw is loosened and then tightened again after the disc has been rotated a sufficient degree to bring a new section of the disc cutting edge into the cutting position. However, the disc type cutting tool has certain disadvantages such as its arrangement for mounting on the tool bar whereby from the disc design the tool itself must withstand certain cutting pressures which cannot be transmitted to the tool bar. Also the holding clamp arrangement for such a tool usually requires a relatively thick cutting part on the steel edge. There are also other disadvantages which are readily apparent to persons familiar with such cutting tools.

In the cutting tool of the present invention the disadvantages of the round disc type cutting tool have been overcome while still maintaining the advantages thereof, namely, the feature of having plural cutting edges which can be successively moved into cutting position as the used cutting edge becomes dulled.

Therefore, one of the objects of the invention is to provide a construction of cutting tool for machine tools which eliminates the use of a bulky clamp for securing the same on the tool bar.

Another object of the invention is to provide a novel construction of cutting tool for lathes having cutting edges disposed parallel to the means connecting the tool and tool bar.

Another object of the invention is to provide a construction of cutting tool having a novel mode of connection with the tool bar or tool holder.

Still another object of the invention is to provide a construction of cutting tool having a plurality of parallel disposed cutting edges which can be used successively as edges become dulled.

A further object of the invention is to provide a construction of cutting tool which enables cutting pressure to be entirely transmitted to the tool bar.

Still a further object of the invention is to provide a relatively small generally rectangular-shaped cutting tool which is compact and rigid in construction while still providing chip removal means on the surfaces thereof.

Other and further objects of the invention reside in the arrangement of the surfaces connecting the tool cutting edges, the novel clamping means and the modified cutting tool construction for copying lathes and the like as set forth more fully in the specification hereinafter following by reference to the accompanying drawings, in which.

Figure 1:
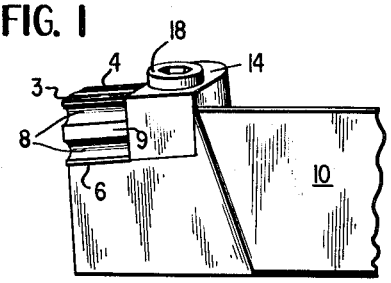
FIG. 1 is a side elevational view of a left handed reversible edge cutting tool according to the invention, mounted on the front portion of a tool bar.

The cutting bit of the present invention, like the disc type cutting bit, is provided with a central hole or aperture, but in this instance the hole extends parallel to the plural cutting edges of the bit. At the perimeter of the hole are a minimum of two surfaces disposed at an angle to each other and arranged in such manner that the resulting cutting pressures upon the cutting edge during the cutting operation presses these surfaces against corresponding surface areas on the tool bar or tool holder thereby transmitting all of the cutting pressures to the tool holders. The cutting bit is secured in position on the tool holder by means of a novel clamp and pin assembly which engages the bit interior thereof and by loosening the clamp and rotating the bit successive cutting edge can be brought into cutting position as previous edges become dulled.

Referring to the drawings in greater detail, the cutting bit indicated generally at 1 is basically a parallelepiped having front and rear generally square faces 2 and four rectangular or square side faces disposed normal to each other and forming the cutting edges 3, 4, 5 and 6 at their respective intersections. An axial bore 7 is provided through the center of the bit in parallel relation to the cutting edges, such that it intersects front and rear faces 2 at substantially right angles.

Each of the side faces bounded by a pair of cutting edges 3–4, 4–5, 5–6 and 6–3 is provided with a pair of longitudinally extending depressed chip-guides 8 respectively placed behind the cutting edges in spaced relation thereto and separated from each other by a land 9. In order to obtain the maximum number of cutting edges in the parallelepiped despite the space required by the chip-guides 8, the cutting tool bit is made of such a width that the chip-guides take up less than half the width of each side face. Hence there remains on each side face between adjacent cutting edges a space consisting of the land 9 and the side portions intermediate the cutting edges and the chip-guides which consists of more than half of the side face area, and this arrangement allows application of maximum cutting strength by the bit and allows the side walls of the bit to be maintained relatively thin and of a desired thickness about the perimeter of the bit. As shown, more particularly in FIG. 5, the wall thickness about the perimeter of the bit is maintained at the distance between the bore 7 and land 9. The cutting element or bit is constructed of high carbide steel, or the like, and this arrangement gives the most compact construction for the cutting bit while maintaining the required wall thickness and cutting strength.

Figure 2:
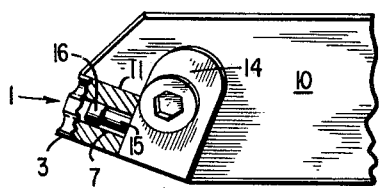
FIG. 2 is a top plan view, partly in section, of the tool of FIG. 1.
Figure 3:
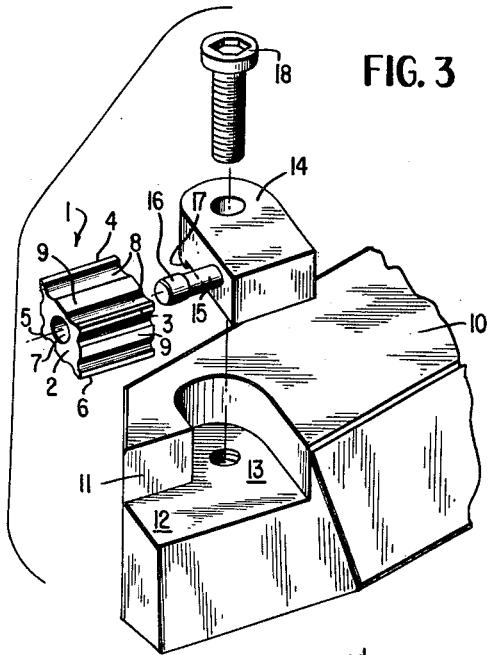
FIG. 3 is an exploded perspective view, on an enlarged scale, of the cutting tool and holder of FIGS. 1 and 2.

As shown in the left handed cutting tool head of FIGS. 1–3, the front portion of the shank 10 of the tool bar or the tool holder is formed with a recess having a pair of seating surfaces 11 and 12 set at an angle to each other and adapted to receive in abutting relation a corresponding pair of cutting bit side faces. The seating surfaces 11 and 12 are preferably set at the same angle to each other as the side faces of the cutting bit and are coextensive with the cutting bit side surfaces.

The front portion of the tool bar shank 10 also carries a recessed portion indicated generally at 13 adjacent the seating surfaces 11 and 12 into which a clamp arm 14 is fitted. A pin 15 of smaller diameter than bore 7 is rigidly connected at one end to arm 14 and carries an enlarged head portion 16 on the opposite end thereof, which extends into bore 7 of the cutting bit and frictionally engages the inner wall thereof at the mid-point of the bore. Clamp arm 14 is provided with a foot portion 17 which engages the bottom of recess 13 at the end disposed opposite pin 15 and is secured in recess 13 by means of screw 18 extending therethrough intermediate foot 17 and pin 15 into threaded engagement with shank 10. Upon turning the screw 18, clamp 14 and pin 15 are pivoted slightly about foot 17, moving the enlarged head portion 16 of the pin into frictional engagement with the side of bore 7 to thus clamp the surfaces defined by cutting edges 4–5 and 5–6, as shown in FIGS. 1–3, against seating surfaces 11 and 12. The enlarged head portion 16 of the pin insures that the pin does not frictionally engage only one side surface of the bore and insures that the cutting bit is seated mutually on surfaces 11 and 12.

The cutting element or bit 1, as previously stated, provides four cutting edges 3–6. As shown in FIGS. 1–3, cutting edge 3 is disposed in the cutting position. As this edge becomes dulled by use, the screw 18 is loosened to release clamp 14 so that the cutting bit can be rotated to bring an unused cutting edge, such as 4, into the position previously occupied by edge 3. When the new edge is brought into cutting position the screw 18 and clamp 14 are again tightened. In using a cutting tool of this type in a lathe, the cutting bit normally contacts the work at a certain angle, such that the cutting edge becomes dulled after a period of use in this position. However, if the cutting bit is reversed, that is, turned end-on-end, the same cutting edge can again be used since it is now contacting the work at a different angle, which has not yet been dulled by use. Thus, the reversible cutting bit of the present invention provides eight positive cutting edges—four in one position of the bit and four additional cutting edges when the bit is turned end-on-end and again inserted on the end of pin 15.

Figure 4:
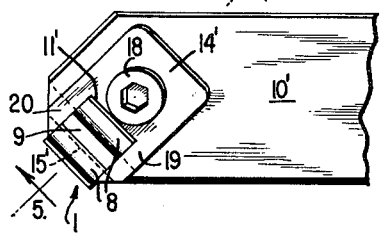
FIG. 4 is a top plan view of the cutting tool or bit with a modified clamping member to form a reversible cutting edge tool for long and plane turning.
Figure 5:
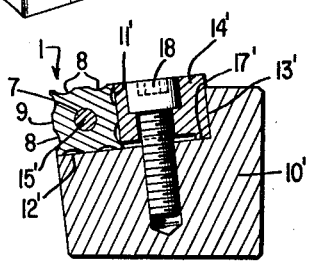
FIG. 5 is a cross-sectional view taken substantially along line 5—5 of FIG. 4.

A modified clamp arm 14' is shown in FIGS. 4 and 5, wherein primed numbers corresponding to the reference numerals in FIGS. 1–3 are used to indicate corresponding parts. In this form of the invention, the clamp 14' is U-shaped having arm portions 19 and 20 straddling the cutting bit 1 and disposed adjacent the front and rear faces 2 and having apertures therethrough in registration with the cutting bit bore 7 for receiving and retaining the connecting pin 15' which extends through arms 19, 20 and the bore of bit 1. In this modified form of the clamp the seating surface 11', corresponding to surface 11 of FIG. 3, is provided on the clamp 14', as indicated, and the cutting bit is secured on the shank 10' in the same manner as previously described.

Figure 6:
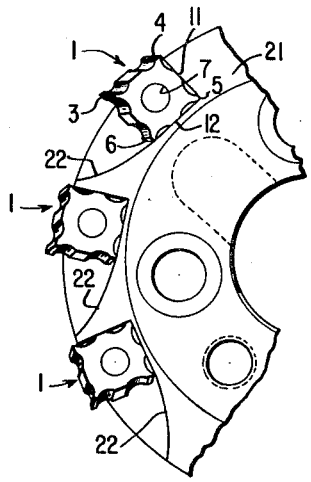
FIG. 6 is a fragmentary front elevational view of a milling machine cutting head incorporating a plurality of cutting bits and clamping members according to the invention.
Figure 7:
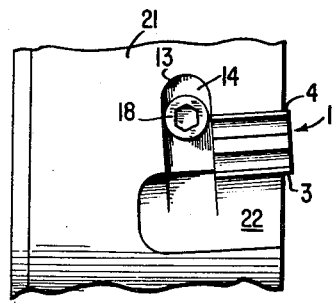
FIG. 7 is a side elevational view of a fragmentary portion of the cutting head of FIG. 6.

In FIGS. 6 and 7 a portion of a circular milling machine cutting head has been shown, carrying a plurality of the cutting bits 1 and clamping arms 14, arranged in the same manner as shown in FIGS. 1–3, about the periphery of the cutting head 21. The clamp arms 14 are disposed in recesses 13 in the outer perimeter surface of the cutting head, with the surfaces of the clamp arms disposed beneath the perimeter surface of cutting head 21. Seating surfaces 11 and 12 are provided in the cutting head as in the previous form of the invention, and a chip removal groove 22 is provided in the cutting head adjacent each of the cutting bits to aid in the removal of chips as each bit engages the work.

Figure 8:
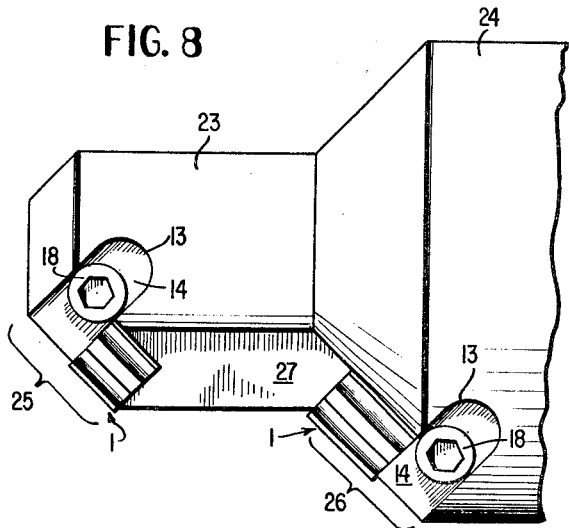
FIG. 8 is a side elevational view of the front portion of a boring rod incorporating a pair of reversible cutting edge cutting bits and associated clamping members according to the invention.
Figure 9:
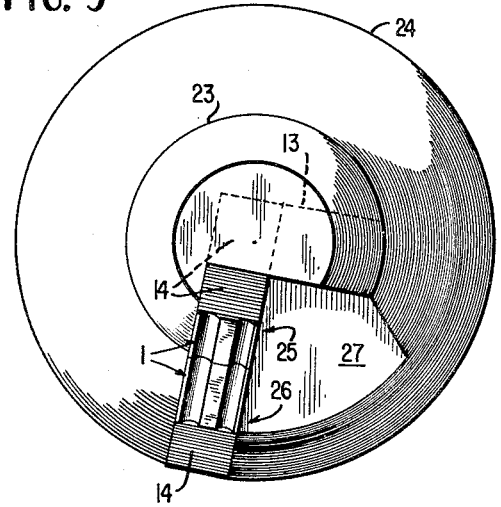
FIG. 9 is a front elevational view of the boring rod of FIG. 8.

A boring rod has been illustrated in FIGS. 8 and 9, illustrating the manner in which the cutting bit and associated clamping means, as disclosed in FIGS. 1–3, can be adapted for use on a boring rod. These illustrations disclose the front portion of a boring rod having sections 23 and 24 of two different diameters. The front section 23 of the rod is used for fine boring of a hole while the bit connected to the larger section 24 of the rod is used for cutting a chamfer on the hole. The cutting bit and clamp assemblies, indicated generally at 25 and 26 on the sections 23 and 24, respectively, of the boring rod, are constructed and mounted in recesses in the rod in substantially the same manner as illustrated in FIGS. 1–3. A chip removal groove 27 is provided between the cutting bit assembly 25 and 26 to aid in removal of chips during the cutting operation. As illustrated, the cutting bit connected on rod section 24 is of greater length than the cutting bit connected on rod section 23, but it is to be understood that these bits may be of any length or equal length. The bits are mounted such that sharp cutting edges may be rotated into cutting position when the used edges become dulled by loosening screws 18, as previously described. The rod recesses also provide seating surfaces so that the cutting pressures exerted on the bit are tranmitted entirely to the boring rod.

Figure 14:
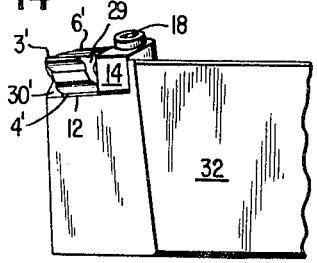
FIG. 14 is a side elevational view of the copying tool of FIG. 13.
Figure 10:
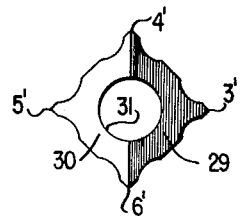
FIG. 10 is a front elevational view of a modified form of the cutting tool or bit according to the invention.
Figure 11:
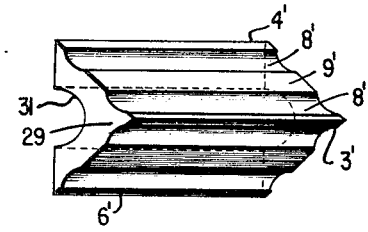
FIG. 11 is a side elevational view of the modified cutting bit of FIG. 10.
Figure 12:
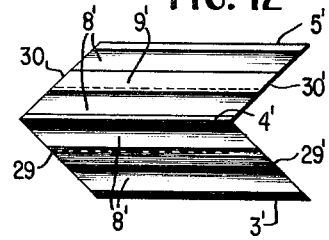
FIG. 12 is a top plan view of the cutting bit of FIGS. 10 and 11.
Figure 13:
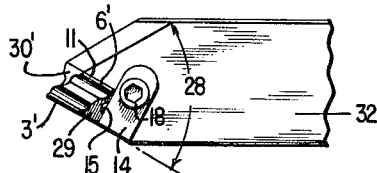
FIG. 13 is a top plan view of the front portion of a copying tool utilizing the modified form of reversible edge cutting bit of FIGS. 10–12.

In FIGS. 10–12 a modified form of the cutting element or bit of the invention has been illustrated with FIGS. 13 and 14 illustrating the manner in which the modified bit is mounted on a tool bar similar to that shown in FIGS. 1–3. The cross-section of the cutting element will in most cases be a square with a cylindrical bore centrally located therein and parallel to the corners of the square which form the cutting edges.

In the first form of the invention, such as illustrated in FIGS. 1–3, the front and rear faces of the bit will be at right angles to the side surfaces so that the cutting element has the shape of a cube or of a rectangular parallelepiped, depending upon the shape of the side faces. However, for copying work on a copying lathe the nose angle 28 of the cutting bit must be less than 90° for reasons known to those skilled in the art. Therefore, the cutting bit shown on an enlarged scale in FIGS. 10–12, is used for copying work on a copying lathe.

Since the nose angle of the bit 28 must be less than 90°, each side surface of the square-shaped cross-sectioned bit, bounded by the cutting edges 3'–4', 4'–5', 5'–6' and 6'–3', is rhomboid-shaped and the front and rear surfaces of the bit are each comprised of a pair of equal triangular surfaces 29–30 and 29'–30', respectively, inclined inwardly toward each other and the bore 31 of the bit with the triangular surfaces forming each end face having the diagonal of the cross-section of the cutting bit as a common base, that is, the common base extends between the cutting edges 4' and 6'. As shown more particularly in FIG. 12, corresponding triangular surfaces forming the front and rear faces of the bit are disposed parallel to each other.

As in the first form of the invention, each of the side surfaces, bounded by the cutting edges, has a pair of chip removal guides 8' formed in the surface thereof and separated by a land 9'. The widths of the chip-guides 8' on each surface are such that they utilize less than half the surface distance between the cutting edges bounding the surface.

The manner in which the modified bit of the invention is mounted on a copying tool bar shank 32 is illustrated in FIGS. 13 and 14. It can be seen that the modified cutting bit is supported on the bar 32 by means of a clamp arm 14, pin 15, screw 18, and seating surfaces 11 and 12 in substantially the identical manner as the bit of the first form of the invention shown in FIGS. 1–3. By loosening the screw 18 and clamp 14 from engagement with bar 32, the copying bit can be rotated to provide a fresh cutting surface in the cutting position when the screw and clamp are again tightened. As in the first form of the invention, eight positive cutting edges are provided by the bit—four in one position and four additional cutting edges when the bit is turned end-on-end and again inserted on the pin 15.

While the invention has been described in certain preferred embodiments, it is realized that modifications can be made and it is to be understood that no limitations upon the invention are intended other than those which may be imposed by the scope of the appended claims.

What I claim as new and desire to secure by Letters Patent of the United States is as follows:

1. A machine tool cutting head comprising a tool holder having a pair of seating surfaces set at an angle to each other, a cutting element having a cutting edge thereon and a bore extending through the element parallel to the cutting edge, a pair of surface areas on the perimeter of said cutting element opposite said cutting edge engaging said pair of seating surfaces, a clamp having a side surface disposed in side-by-side relation with said cutting element with said side surface disposed in abutment with one end of said cutting element, a pin extending from said side surface into the bore of said cutting element, and a clamping bolt extending through said clamp into engagement with said tool holder for drawing said pin laterally into engagement with the cutting element bore and said pair of surface areas into engagement with said pair of seating surfaces.

2. A machine tool cutting head as set forth in claim 1 in which said clamp is U-shaped with the arms of the U disposed adjacent opposite ends of said cutting element and the bore therethrough and engaging the ends of said pin.

3. A machine tool cutting head as set forth in claim 1 in which the bore of said cutting element is smooth, and said pin carries an enlarged portion of smaller diameter than the bore disposed in fractional engagement with the smooth bore and positioned substantially centrally within the length of the cutting element bore.

4. A machine tool cutting head as set forth in claim 1 in which said pin and said clamping bolt are disposed substantially at right angles to each other.

5. A cutting tool comprising a support body portion having a first recessed portion along one edge thereof, a pair of seating surfaces set at an angle to each other forming said first recessed portion, a parallelepiped cutting element disposed on said pair of seating surfaces, and having a central bore therethrough, a plurality of longitudinally extending cutting edges on said cutting element extending parallel to the bore and with said pair of seating surfaces, said support body portion having a second recessed portion extending generally normal to said first recessed portion, a clamp having an opening therethrough mounted in said second recessed portion with a portion of said clamp disposed in side-by-side relation with at least one end of said cutting element, a pin connected to said clamp extending into the bore of said cutting element, and means extending through the clamp opening into engagement with said support body portion for imparting lateral clamping motion to said pin.

References Cited by the Examiner

UNITED STATES PATENTS

| | | | |
|---|---|---|---|
| 1,396,180 | 11/21 | Fors | 29—96 |
| 1,449,513 | 3/23 | Jaeger | 29—95 |
| 2,999,301 | 9/61 | Conti | 29—96 |
| 3,060,554 | 10/62 | Kirchner | 29—96 |

FOREIGN PATENTS

| | | |
|---|---|---|
| 147,041 | 7/21 | Great Britain. |
| 552,382 | 4/43 | Great Britain. |
| 831,244 | 3/60 | Great Britain. |
| 659,770 | 2/29 | France. |
| 1,204,054 | 1/60 | France. |
| 1,245,148 | 9/60 | France. |

WILLIAM W. DYER, JR., *Primary Examiner.*